(12) United States Patent
Srinivasan et al.

(10) Patent No.: US 7,056,857 B2
(45) Date of Patent: Jun. 6, 2006

(54) FISCHER-TROPSCH CATALYSTS USING MULTIPLE PRECURSORS

(75) Inventors: Nithya Srinivasan, Ponca City, OK (US); Rafael L. Espinoza, Ponca City, OK (US); Kevin L. Coy, Ponca City, OK (US); Kandaswamy Jothimurugesan, Ponca City, OK (US)

(73) Assignee: ConocoPhillips Company, Houston, TX (US)

( * ) Notice: Subject to any disclaimer, the term of this patent is extended or adjusted under 35 U.S.C. 154(b) by 0 days.

(21) Appl. No.: 10/965,606

(22) Filed: Oct. 14, 2004

(65) Prior Publication Data

US 2005/0107249 A1    May 19, 2005

Related U.S. Application Data

(62) Division of application No. 10/236,759, filed on Sep. 6, 2002, now Pat. No. 6,822,008.

(51) Int. Cl.
  *B01J 23/00* (2006.01)
  *B01J 21/00* (2006.01)
  *B01J 23/40* (2006.01)
  *B01J 23/42* (2006.01)
  *B01J 23/58* (2006.01)

(52) U.S. Cl. ............... 502/327; 502/260; 502/330; 502/332; 502/333; 502/334; 502/339; 502/349; 502/350; 502/351; 502/355; 502/415; 502/439

(58) Field of Classification Search ......... 502/241, 502/242, 243, 260, 263, 301, 326, 327, 330, 502/332–334, 339, 349–351, 355, 415, 439
See application file for complete search history.

(56) References Cited

U.S. PATENT DOCUMENTS

| | | | |
|---|---|---|---|
| 4,088,671 A | 5/1978 | Kobylinski | 260/449.6 |
| 4,396,539 A | 8/1983 | Sapienza et al. | 252/455 R |
| 4,522,939 A | 6/1985 | Minderhoud et al. | 502/242 |
| 4,544,481 A | 10/1985 | Seiver et al. | 208/215 |
| 4,585,798 A | 4/1986 | Beuther et al. | 518/715 |
| 4,613,624 A | 9/1986 | Beuther et al. | 518/715 |
| 4,637,993 A * | 1/1987 | van Erp et al. | 502/242 |
| 4,670,414 A * | 6/1987 | Kobylinski et al. | 502/174 |
| 4,681,867 A * | 7/1987 | Dyer et al. | 502/242 |
| 4,717,702 A | 1/1988 | Beuther et al. | 502/303 |
| 4,724,226 A * | 2/1988 | Cheng et al. | 502/204 |
| 4,738,948 A | 4/1988 | Iglesia et al. | 502/326 |
| 4,762,959 A | 8/1988 | Mauldin et al. | 585/640 |
| 4,787,969 A | 11/1988 | Baird, Jr. | 208/139 |
| 4,822,824 A | 4/1989 | Iglesia et al. | 518/709 |
| 4,857,497 A * | 8/1989 | De Jong et al. | 502/242 |
| 4,962,078 A * | 10/1990 | Behrmann et al. | 502/325 |
| 4,992,406 A * | 2/1991 | Mauldin et al. | 502/304 |
| 5,036,032 A * | 7/1991 | Iglesia et al. | 502/260 |
| 5,102,851 A | 4/1992 | Eri et al. | 502/302 |
| 5,116,879 A | 5/1992 | Eri et al. | 518/716 |
| 5,128,377 A | 7/1992 | Behrmann et al. | 518/715 |
| 5,292,705 A * | 3/1994 | Mitchell | 502/325 |
| 5,756,419 A | 5/1998 | Chaumette et al. | 502/313 |
| 5,856,365 A | 1/1999 | Zennaro et al. | 518/715 |
| 5,928,983 A | 7/1999 | Culross | 502/170 |
| 5,939,350 A * | 8/1999 | Singleton et al. | 502/230 |
| 6,075,062 A | 6/2000 | Zennaro et al. | 518/715 |
| 6,117,814 A * | 9/2000 | Plecha et al. | 502/325 |
| 6,121,190 A | 9/2000 | Zennaro et al. | 502/326 |
| 6,136,868 A | 10/2000 | Culross et al. | 518/700 |
| H001948 H * | 3/2001 | Rusek et al. | 502/344 |
| 6,271,432 B1 | 8/2001 | Singleton et al. | 585/700 |
| RE37,406 E | 10/2001 | Behrmann et al. | 518/715 |
| 6,300,268 B1 * | 10/2001 | Lapidus et al. | 502/38 |
| 6,313,062 B1 | 11/2001 | Krylova et al. | 502/326 |
| 6,365,544 B1 * | 4/2002 | Herron et al. | 502/326 |
| 6,465,530 B1 * | 10/2002 | Roy-Auberger et al. | 518/715 |
| 6,608,001 B1 * | 8/2003 | Allison | 502/240 |
| 6,683,024 B1 * | 1/2004 | Khare et al. | 502/400 |
| 6,806,226 B1 * | 10/2004 | Van Berge et al. | 502/326 |
| 6,835,690 B1 * | 12/2004 | Van Berge et al. | 502/328 |

OTHER PUBLICATIONS

Shouli Sun, et al.; *Active Co/SiO$_2$ Catalysts Prepared from Mixing Precursors for Slurry Phase Fischer-Tropsch Synthesis*; Chemistry Letters 1999 (pp. 343-344).

Martin Kraum, et al; *Fischer-Tropsch Synthesis: The Influence of Various Cobalt Compounds Applied in the Preparation of Supported Cobalt Catalysts on their Performance*; Applied Catalysis A: General 186 (1999) (pp. 189-200).

Tsubaki et al., *Different Functions of the Noble Metals Added to Cobalt Catalyst for Fischer-Tropsch Synthesis*, Chemical Abstract (DN:134:13368), Journal of Catalysis (2001), 199 (2), 236-246.

* cited by examiner

*Primary Examiner*—Cam N. Nguyen
(74) *Attorney, Agent, or Firm*—Conley Rose P.C.

(57) ABSTRACT

A method for making a catalyst is provided that features loading a catalytic metal to a support using at least two different precursor compounds of that said metal; and loading the promoter to the support in an amount effective so as to achieve similar promotion as for a comparable catalyst comprising a greater amount of the promoter using only one precursor compound, where the catalytic metal is selected from among Group 8 metals, 9 metal, Group 10 metals, and combinations thereof. The promoter is preferably boron, silver, a noble metal, or combination thereof. Also provided are catalysts made by the method and Fischer-Tropsch processes that include contacting synthesis gas with a catalyst made by the method.

20 Claims, No Drawings

FISCHER-TROPSCH CATALYSTS USING MULTIPLE PRECURSORS

CROSS-REFERENCE TO RELATED APPLICATIONS

This is a divisional application and claims benefit of U.S. patent application Ser. No. 10/236,759, filed Sep. 6, 2002, U.S. Pat. No. 6,822,008, entitled Fischer-Tropsch Catalysts Using Multiple Precursors, which is hereby incorporated by reference in its entirety.

FIELD OF THE INVENTION

The present invention relates generally to a method for making a catalyst that includes loading a catalytic metal to a support where the catalytic metal is in the form of at least two precursor compounds and loading a promoter to the support. More particularly, the present invention relates to a catalyst made by the above-described method and the use thereof in a process for the production of hydrocarbons that includes contacting carbon monoxide and hydrogen with the catalyst.

BACKGROUND OF THE INVENTION

Natural gas, found in deposits in the earth, is an abundant energy resource. For example, natural gas commonly serves as a fuel for heating, cooking, and power generation, among other things. The process of obtaining natural gas from an earth formation typically includes drilling a well into the formation. Wells that provide natural gas are often remote from locations with a demand for the consumption of the natural gas.

Thus, natural gas is conventionally transported large distances from the wellhead to commercial destinations in pipelines. This transportation presents technological challenges due in part to the large volume occupied by a gas. Because the volume of a gas is so much greater than the volume of a liquid containing the same number of gas molecules, the process of transporting natural gas typically includes chilling and/or pressurizing the natural gas in order to liquefy it. However, this contributes to the final cost of the natural gas and is not economical.

Further, naturally occurring sources of crude oil used for liquid fuels such as gasoline and middle distillates have been decreasing and supplies are not expected to meet demand in the coming years. Middle distillates typically include heating oil, jet fuel, diesel fuel, and kerosene. Fuels that are liquid under standard atmospheric conditions have the advantage that in addition to their value, they can be transported more easily in a pipeline than natural gas, since they do not require energy, equipment, and expense required for liquefaction.

Thus, for all of the above-described reasons, there has been interest in developing technologies for converting natural gas to more readily transportable liquid fuels, i.e. to fuels that are liquid at standard temperatures and pressures. One method for converting natural gas to liquid fuels involves two sequential chemical transformations. In the first transformation, natural gas or methane, the major chemical component of natural gas, is reacted with oxygen to form syngas, which is a combination of carbon monoxide gas and hydrogen gas. In the second transformation, known as the Fischer-Tropsch process, carbon monoxide is converted into a mixture of carbon monoxide and hydrogen (i.e., synthesis gas or syngas). Those organic molecules containing only carbon and hydrogen are known as hydrocarbons. In addition, other organic molecules containing oxygen in addition to carbon and hydrogen known as oxygenates may be formed during the Fischer-Tropsch process. Hydrocarbons having carbons linked in a straight chain are known as aliphatic hydrocarbons that may include paraffins and/or olefins. Paraffins are particularly desirable as the basis of synthetic diesel fuel.

The Fischer-Tropsch process is commonly facilitated by a catalyst. Catalysts desirably have the function of increasing the rate of a reaction without being consumed by the reaction. A feed containing carbon monoxide and hydrogen is typically contacted with a catalyst in a reactor. In a batch process, the reactor is closed to introduction of new feed and exit of products. In a continuous process, the reactor is open, with an inflow containing feed, termed a feed stream, passed into the reactor and an outflow containing product, termed a product stream, passed out of the reactor.

Typically the Fischer-Tropsch product stream contains hydrocarbons having a range of numbers of carbon atoms, and thus having a range of molecular weights. Thus, the Fischer-Tropsch products produced by conversion of natural gas commonly contain a range of hydrocarbons including gases, liquids and waxes. Depending on the molecular weight product distribution, different Fischer-Tropsch product mixtures are ideally suited to different uses. For example, Fischer-Tropsch product mixtures containing liquids may be processed to yield gasoline, as well as heavier middle distillates. Hydrocarbon waxes may be subjected to an additional processing step for conversion to liquid and/or gaseous hydrocarbons. Thus, in the production of a Fischer-Tropsch product stream for processing to a fuel it is desirable to obtain primarily hydrocarbons that are liquids and waxes, that are nongaseous hydrocarbons (e.g. $C_{5+}$ hydrocarbons).

Typically, in the Fischer-Tropsch synthesis, the product spectra can be described by likening the Fischer-Tropsch reaction to a polymerization reaction with a Shultz-Flory chain growth probability ($\alpha$) that is independent of the number of carbon atoms in the lengthening molecule. $\alpha$ is typically interpreted as the ratio of the mol fraction of the $C_{n+1}$ product to the mol fraction of the $C_n$ product. A value of $\alpha$ of at least 0.72 is desirable for producing high carbon-length hydrocarbons, such as those of diesel fractions.

The composition of a catalyst influences the relative amounts of hydrocarbons obtained from a Fischer-Tropsch catalytic process. Common catalysts for use in the Fischer-Tropsch process contain at least one metal from Groups 8, 9, or 10 of the Periodic Table (in the new IUPAC notation, which is used throughout the present specification).

Cobalt metal is particularly desirable in catalysts used in converting natural gas to heavy hydrocarbons suitable for the production of diesel fuel. Alternatively, iron, nickel, and ruthenium have been used in Fischer-Tropsch catalysts. Nickel catalysts favor termination and are useful for aiding the selective production of methane from syngas. Iron has the advantage of being readily available and relatively inexpensive but the disadvantage of a water-gas shift activity. Ruthenium has the advantage of high activity but is quite expensive. Consequently, although ruthenium is not the economically preferred catalyst for commercial Fischer-Tropsch production, it is often used in low concentrations as a reduction promoter, particularly for cobalt based Fischer-Tropsch catalysts.

Catalysts often further employ a promoter in conjunction with the principal catalytic metal. A promoter typically improves a measure of the performance of a catalyst, such as productivity, lifetime, selectivity, reducibility, or regenerability. Further, in addition to the catalytic metal, a Fischer-Tropsch catalyst often includes a support material. The support is typically a porous material that provides mechanical strength and a high surface area, in which the active metal and promoter(s) can be deposited. Catalyst supports for catalysts used in Fischer-Tropsch synthesis of hydrocarbons have typically been refractory oxides (e.g., silica, alumina, titania, thoria, zirconia or mixtures thereof, such as silica-alumina). In particular, y-alumina is a popular support for Fischer-Tropsch catalysts.

The method of preparation of a catalyst may influence the performance of the catalyst in the Fischer-Tropsch reaction. In a common method of loading a Fischer-Tropsch metal to a support, the support is impregnated with a solution containing a dissolved metal-containing compound. The metal may be impregnated in a single impregnation, drying and calcinations step or in multiple steps. When a promoter is used, an impregnation solution may further contain a promoter-containing compound. After drying the support, the resulting catalyst precursor is calcined, typically by heating in an oxidizing atmosphere, to decompose the metal-containing compound to a metal oxide. When the catalytic metal is cobalt, the catalyst precursor is then typically reduced in hydrogen to convert the oxide compound to reduced "metallic" metal. When the catalyst includes a promoter, the reduction conditions may cause reduction of the promoter or the promoter may remain as an oxide compound. Despite the vast knowledge of preparation techniques, there is ongoing effort for improving methods of catalyst preparation.

Kraum and Baems (Applied Catalyst A: General 1999, 186, p. 189) describe studies of the performance of titania-supported catalysts prepared with various cobalt compounds, including cobalt (III) acetyl acetonate, cobalt acetate, cobalt oxalate, cobalt nitrate, and cobalt-EDTA. The nominal cobalt loading was 12 wt %. They concluded that "the type of cobalt precursor used for the preparation of $TiO_2$ supported catalysts affects activity and chain growth probability under fixed FTS [Fischer-Tropsch synthesis] conditions". In particular, they concluded that "For titania-supported catalysts, the use of oxalate, acetate and acetyl acetonate as cobalt precursors resulted in higher activity compared with the reference catalyst prepared from nitrate." However, the authors further concluded that "the range of chain growth probabilities increased in the following order, cobalt (III) acetyl acetonate ($\alpha$=0.71)<cobalt acetate ($\alpha$=0.74)<cobalt (III) acetyl acetonate, cobalt oxalate, cobalt nitrate, cobalt-EDTA ($\alpha$=0.82–0.84)." The authors further reported that "On adding 0.1 wt % Ru to the catalyst made from cobalt (III) acetyl acetonate, $\alpha$ increased from 0.71 to 0.80." Thus although the titania-supported catalysts prepared with cobalt acetate and cobalt (III) acetyl acetonate had higher activity, they were also less selective to heavier hydrocarbons.

Fan and Fujimoto. (Chemistry Letters 1999, p. 343) describe studies of the performance of silica supported catalysts prepared with various cobalt compounds, including cobalt nitrate, cobalt acetate, cobalt chloride, and combinations of cobalt nitrate and cobalt acetate. Catalysts made by co-impregnating and sequentially impregnating cobalt nitrate and cobalt acetate were studied. The nominal cobalt loading was 10 wt. %. The authors disclosed that 'the order of catalytic activity was Co (N/A)>Co (N+A), Co (A/N) and Co (N)>>Co (A)." where Co (N/A) indicates nitrate impregnated before acetate and Co (N+A) indicates nitrate and acetate co-impregnated. Reported chain growth probabilities were similar for Co (N/A), Co (N+A), Co (A/N), and Co (N) ($\alpha$=0.84–0.86).

A comparison of the results of Fan and Fujimoto with those of Kraum and Baems suggests that the variation in catalyst performance with various cobalt compounds is dependent on the nature of the support. Further, it is known that cobalt interacts more strongly with alumina than silica. Thus, there remains a need for an improved method of preparing a supported cobalt catalyst where the support includes alumina.

Further, it is well known that the use of noble metals improves the performance of cobalt-based Fischer-Tropsch catalysts. However, the use of noble metal promoters has the disadvantage of increasing the cost of Fischer-Tropsch catalysts. Thus, there remains a need for a method of making a cobalt-based Fischer-Tropsch catalyst that involves the use of reduced amounts of noble metal promoters.

SUMMARY OF THE PREFERRED EMBODIMENTS

According to a preferred embodiment of the present invention, method for making a catalyst features loading a catalytic metal to a support in a single or multi-step impregnations, using at least two different precursors of that metal. The method may further include loading a promoter to the support in an amount effective so as to achieve similar promotion as for a comparable catalyst comprising a greater amount of the promoter using just one precursor of that said catalyst metal.

The effective amount of promoter is preferably not more than 75%, more preferably not more than 50% of the content of promoter in the comparable catalyst.

It is preferred that one precursor is more easily reduced than the other(s), or that it produces an intermediate that is more easily reduced than the other(s).

Each of the steps of loading of the cobalt as the first precursor compound, loading of the cobalt as the second precursor compound, and loading the promoter may be carried out singly or in combination with any one or combination of the other steps and in any order.

A promoter preferably enhances the performance of the catalyst. Suitable measures of the performance that may be enhanced include selectivity towards desired products, activity, stability, lifetime, reducibility and resistance to potential poisoning by impurities such as sulfur, nitrogen, and oxygen-containing compounds. A promoter is preferably a Fischer-Tropsch promoter, that is an element or compound that enhances the performance of a Fischer-Tropsch catalyst in a Fischer-Tropsch process.

The catalytic metal is selected from among Group 8 metals, 9 metal, Group 10 metals, and combinations thereof, more preferably from among cobalt, iron, and combinations thereof.

The promoter is preferably selected from the group consisting of rhenium, ruthenium, platinum, palladium, rhodium, copper, silver, boron, potassium and gold.

The support preferably includes at least one metal oxide and may include at least a second metal oxide. The support more preferably includes at least 50% by weight alumina.

According to an alternative embodiment of the present invention, a process for the production of hydrocarbons features contacting carbon monoxide and hydrogen with a catalyst so as to convert at least a portion of the carbon monoxide to the hydrocarbons, wherein the catalyst is made by any of the above-described methods.

According to any one of the above-described embodiments the hydrocarbons may include diesel-range hydrocarbons. Alternatively, or in combination, the hydrocarbons may include waxes suitable for further processing into diesel-range hydrocarbons. In some embodiments, the hydrocarbons may be selected from among liquid hydrocarbons, non-gaseous hydrocarbons middle distillates, $C_{5+}$ hydrocarbons, and $C_{11+}$ hydrocarbons.

Thus, the preferred embodiments of the present invention comprise a combination of features and advantages which enable it to overcome various problems of prior catalysts and processes. The various characteristics described above, as well as other features, will be readily apparent to those skilled in the art upon reading the following detailed description of the preferred embodiments of the invention.

DETAILED DESCRIPTION OF THE PREFERRED EMBODIMENTS

Catalyst Preparation

The present method of making a catalyst preferably includes loading a Fischer-Tropsch metal using a single or multi-step impregnation technique, to a support as a first precursor compound and a second precursor compound, and loading a promoter to the support. The Fischer-Tropsch metal preferably includes cobalt. The support preferably includes alumina. The promoter is preferably at least one of rhenium, ruthenium, platinum, palladium, boron, silver, rhodium, gold, precursor compounds, also termed herein promoter compounds. According to some embodiments, the promoter is a metal that acts as a reduction promoter.

The second precursor compound may be loaded separately after the first precursor compound. Alternatively, the second precursor compound may be loaded concurrently with the first precursor compound.

At least one of the Fischer-Tropsch metal precursor compounds is preferably more easily reduced than the other. Alternatively at least one of the Fischer-Tropsch metal precursors produces an intermediate that is more readily reduced than the other precursor(s). The more easily reduced precursor compound is preferably loaded to the support before the less easily reduced precursor compound(s). Although wishing not to be bound or limited by this particular theory, the applicants believe that the improvement in reduction from the use of at least 2 different precursors of the same active metal is a result of the hydrogen spillover effect, thus resulting in needing less precious metal promoter to achieve similar catalyst performance.

Thus, the method preferably includes loading the promoter to the support in an amount effective so as to achieve similar promotion, and thus catalyst performance, as for a comparable catalyst comprising a greater amount of the promoter prepared by using only one catalytic metal precursor. The effective amount of promoter is preferably not more than 75%, more preferably not more than 50% of the content of promoter in the comparable catalyst.

Each of the steps of loading of the cobalt as the first precursor compound, loading of the cobalt as the second precursor compound, and loading the promoter may be carried out singly or in combination with any one or combination of the other steps and in any order.

Loading a metal to a support as a precursor compound may be accomplished by impregnation of the support with a solution containing the precursor compound. The precursor compound may be a metal salt. The solvent may be water. Alternatively, the solvent may be an organic solvent, such as acetone, methanol, higher alcohols, hexane, benzene, and the like. The impregnation may be incipient wetness impregnation. Thus the impregnation may include contacting the support with a solution having a volume just sufficient to fill the pores of the support. Further, the impregnation may include slurrying the support into the solution containing the precursor compound. Further it is understood that the impregnation can be done using multiple steps, and that drying or calcination are optionally done in between each impregnation step. Typically, when the impregnated support is dried, drying proceeds for from 0.5 to 24 hours at a pressure of 1 to 75 atm and a temperature between 70° C. and 150° C. Further, typically, when the impregnated support is calcined, calcination proceeds for from 0.5 to 24 hours at a pressure of 1 to 75 atm and a temperature between 200° C. and 900° C.

A promoter may be loaded simultaneous with at least a portion of the Fischer-Tropsch metal. Alternatively, a promoter may be loaded after any Fischer-Tropsch metal. Still alternatively, a promoter compound may be loaded before any Fischer-Tropsch metal. Still alternatively, a promoter may be loaded between different steps of loading any Fischer-Tropsch metal. It is noted that the preferred method for loading the promoter is incipient wetness impregnation of a precursor compound of the promoter, although other methods known in the art are also suitable for loading a promoter. Either water or organic solvents may be used according to the solubility of the compound. The promoter precursor compound may be a salt. It is understood that the impregnation of the promoter precursor compound can be done using multiple steps, and that drying or calcination, as described above, are optionally done in between each impregnation step.

Suitable cobalt-containing precursor compounds include, for example, hydrated cobalt nitrate (e.g. cobalt nitrate hexahydrate), cobalt carbonyl, cobalt acetate, cobalt acetylacetonate, cobalt oxalate, and the like. Hydrated cobalt nitrate, cobalt carbonyl and cobalt acetate are exemplary of cobalt-containing precursor compounds soluble in water. Cobalt oxalate is soluble in acids or acidic solutions. Cobalt acetate and cobalt acetylacetonate are exemplary of cobalt-containing precursor compounds soluble in organic solvents.

Suitable rhenium-containing precursor compounds soluble in water are preferred and include, for example, perrhenic acid, ammonium perrhenate, rhenium pentacarbonyl chloride, rhenium carbonyl, and the like.

Suitable ruthenium-containing precursor compounds soluble in water include for example ruthenium carbonyl, $Ru(NH_3)_6.Cl_3$, Ru(III)2,4-pentanedionoate, ruthenium nitrosyl nitrate, and the like. Water-soluble ruthenium-containing precursor compounds are preferred.

Suitable platinum-containing precursor compounds soluble in water include, for example, $Pt(NH_3)_4(NO_3)_2$ and the like. Alternatively, the platinum-containing precursor may be soluble in an organic solvent, such as platinum acetyl acetonate soluble in acetone.

Suitable boron-containing precursor compounds soluble in water include, for example, boric acid, and the like. Alternatively, the boron-containing precursor may be soluble in an organic solvent.

Suitable silver-containing precursor compounds soluble in water include, for example, silver nitrate ($AgNO_3$) and the like. Alternatively, the silver-containing precursor may be soluble in an organic solvent.

Suitable palladium-containing precursor compounds include palladium nitrate ($Pd(NO_3)_2$) and the like. Suitable palladium-containing precursor compounds soluble in an organic solvent include palladium dioxide ($PdO_2$), which is soluble in acetone, and the like.

Typically, at least a portion of the metal(s) of the catalytic metal component of the catalysts of the present invention is present in a reduced state (i.e., in the metallic state). Therefore, it is normally advantageous to activate the catalyst prior to use by a reduction treatment, in the presence of hydrogen at an elevated temperature. Typically, the catalyst is treated with hydrogen at a temperature in the range of from about 75° C. to about 500° C., for about 0.5 to about 36 hours at a pressure of about 1 to about 75 atm, more preferably of about 1 to about 10 atm. Pure hydrogen may be used in the reduction treatment, as may a mixture of hydrogen and an inert gas such as nitrogen, or a mixture of hydrogen and other gases as are known in the art, such as light hydrocarbons, carbon monoxide and carbon dioxide. Reduction with pure hydrogen and reduction with a mixture of mainly hydrogen and carbon monoxide are preferred. The amount of hydrogen may range from about 1% to about 100% by volume.

Catalyst

The present catalyst preferably includes a catalytic metal. The catalytic metal is preferably a Fischer-Tropsch catalytic metal. In particular, the catalytic metal is preferably selected from the among the Group 8 metals, such as iron (Fe), ruthenium (Ru), and osmium (Os), Group 9 metals, such as cobalt (Co), rhodium (Rh), and iridium (Ir), Group 10 elements, such as nickel (Ni), palladium (Pd), and platinum (Pt), and the metals molybdenum (Mo), rhenium (Re), and tungsten (W). The catalytic metal is more preferably selected from the iron-group metals (i.e. cobalt, iron, and nickel), and combinations thereof. The catalytic metal still more preferably is selected from among cobalt and iron. The catalyst preferably contains a catalytically effective amount of the catalytic metal. The amount of catalytic metal present in the catalyst may vary widely.

When the catalytic metal is cobalt, the catalyst preferably includes cobalt in an amount totaling from about 1% to about 50% by weight (as the metal) of total catalyst composition (catalytic metal, support, and any optional promoters), more preferably from about 5% to about 40% by weight, still more preferably from about 10% to about 37% by weight. It will be understood that % indicates percent throughout the present specification.

It will be understood that, when the catalyst includes more than one supported metal, the catalytic metal, as termed herein, is the primary supported metal present in the catalyst. The primary supported metal is preferably determined by weight, that is the primary supported metal is preferably present in the greatest % by weight.

The catalytic metal contained by a catalyst according to a preferred embodiment of the present invention is preferably in a reduced, metallic state before use of the catalyst in the Fischer-Tropsch synthesis. However, it will be understood that the catalytic metal may be present in the form of a metal compound, such as a metal oxide, a metal hydroxide, and the like. The catalytic metal is preferably uniformly dispersed throughout a support. It is also understood that the catalytic metal can be also present at the surface of the support, in particular on the surface or within a surface region of the support, or that the catalytic metal can be non-homogeneously dispersed onto the support.

Suitable support materials include metal oxides, and combinations thereof. For example, suitable support materials include but are not limited to alumina, modified alumina, silica-alumina, titania, zirconia, fluorided metal oxides, borated alumina, aluminum fluoride, aluminum boride, and combinations thereof. Alumina or modified alumina are preferred supports. Optionally, the present catalyst may also include at least one promoter known to those skilled in the art. The promoter may vary according to the catalytic metal. A promoter may be an element that also, in an active form, has catalytic activity, in the absence of the catalytic metal, such as ruthenium. Such an element will be termed herein a promoter when it is present in the catalyst in a lesser wt. % than the catalytic metal.

A promoter preferably enhances the performance of the catalyst. Suitable measures of the performance that may be enhanced include selectivity towards desired products, activity, stability, lifetime, reducibility and resistance to potential poisoning by impurities such as sulfur, nitrogen, and oxygen-containing compounds. A promoter is preferably a Fischer-Tropsch promoter, that is an element or compound that enhances the performance of a Fischer-Tropsch catalyst in a Fischer-Tropsch process.

It will be understood that as contemplated herein, an enhanced performance of a promoted catalyst may be calculated according to any suitable method known to one of ordinary skill in the art. In particular, an enhanced performance may be given as a percent and computed as the ratio of the performance difference to the performance of a reference catalyst. The performance difference is between the performance of the promoted catalyst and the reference catalyst, where the reference catalyst is a similar corresponding catalyst having the nominally same amounts, e.g. by weight percent, of all components except the promoter. It will further be understood that as contemplated herein, a performance may be measured in any suitable units. For example, when the performance is the productivity, the productivity may be measured in grams product per hour per liter reactor volume, grams product per hour per kilogram catalyst, and the like.

Suitable promoters vary with the catalytic metal and may be selected from Groups 1–15 of the Periodic Table of the Elements. A promoter may be in elemental form. Alternatively, a promoter may be present in an oxide compound. Further, a promoter may be present in an alloy containing the catalytic metal. Except as otherwise specified herein, a promoter is preferably present in an amount to provide a weight ratio of elemental promoter: elemental catalytic metal of from about 0.00005:1 to about 0.5:1, preferably, from about 0.0005:1 to about 0.1:1 (dry basis).

Further, by way of example and not limitation, when the catalytic metal is cobalt, suitable promoters include Group 1 elements such as potassium (K), lithium (Li), sodium (Na), and cesium (Cs), Group 2 elements such as calcium (Ca), magnesium (Mg), strontium (Sr), and barium (Ba), Group 3 elements such as scandium (Sc), yttrium (Y), and lanthanum (La), Group 4 elements such as (titanium) (Ti), zirconium (Zr), and hafnium (Hf), Group 5 elements such as vanadium (V), niobium (Nb), and tantalum (Ta), Group 6 elements such as molybdenum (Mo) and tungsten (W), Group 7 elements such as rhenium (Re) and manganese (Mn), Group 8 elements such as ruthenium (Ru) and osmium (Os), Group 9 elements such as rhodium (Rh) and iridium (Ir), Group 10 elements such as platinum (Pt) and palladium (Pd), Group 11 elements such as silver (Ag) and copper (Cu), Group 12 elements, such as zinc (Zn), cadmium (Cd), and mercury (Hg), Group 13 elements, such as gallium (Ga), indium (In), thallium (Ti), and boron (B), Group 14 elements such as tin (Sn) and lead (Pb), and Group 15 elements such as phosphorus (P), bismuth (Bi), and antimony (Sb). When the catalytic metal is cobalt, the promoter is preferably selected from among rhenium, ruthenium, platinum, palladium, boron, silver, and combinations thereof.

When the catalyst includes rhenium, the rhenium is preferably present in the catalyst in an amount between about 0.001 and about 5% by weight, more preferably between about 0.01 and about 2% by weight, most preferably between about 0.2 and about 1% by weight.

When the catalyst includes ruthenium, the ruthenium is preferably present in the catalyst in an amount between about 0.0001 and about 5% by weight, more preferably between about 0.001 and about 1% by weight, most preferably between about 0.01 and about 1% by weight.

When the catalyst includes platinum, the platinum is preferably present in the catalyst in an amount between about 0.00001 and about 5% by weight, more preferably between about 0.0001 and about 1% by weight, and most preferably between about 0.0005 and 1% by weight.

When the catalyst includes palladium, the palladium is preferably present in the catalyst in an amount between about 0.001 and about 5% by weight, more preferably between about 0.01 and about 2% by weight, most preferably between about 0.2 and about 1% by weight.

When the catalyst includes silver, the catalyst preferably has a nominal composition including from about 0.05 to about 10 wt % silver, more preferably from about 0.07 to about 7 wt % silver, still more preferably from about 0.1 to about 5 wt % silver.

When the catalyst includes boron, the catalyst preferably has a nominal composition including from about 0.025 to about 2 wt % boron, more preferably from about 0.05 to about 1.8 wt. % boron, still more preferably from about 0.075 to about 1.5 wt % boron.

As used herein, a nominal composition is preferably a composition specified with respect to an active catalyst. The active catalyst may be either fresh or regenerated. The nominal composition may be determined by experimental elemental analysis of an active catalyst. Alternatively, the nominal composition may be determined by numerical analysis from the known amounts of catalytic metal, promoter, and support used to make the catalyst. It will be understood that the nominal composition as determined by these two methods will typically agree within conventional accuracy.

Further, as used herein, it will be understood that each of the ranges, such as of ratio or weight %, herein is inclusive of its lower and upper values.

Fischer-Tropsch Operation

A process for producing hydrocarbons preferably includes contacting a feed stream that includes carbon monoxide and hydrogen with the present catalyst. Alternatively or in combination, a process for producing hydrocarbons includes contacting a feed stream that includes carbon monoxide and hydrogen with a catalyst in reaction zone so as to produce hydrocarbons, where the catalyst is a catalyst made according to the present method.

The feed gas charged to the process for producing hydrocarbons includes hydrogen, or a hydrogen source, and carbon monoxide. $H_2/CO$ mixtures suitable as a feedstock for conversion to hydrocarbons according to the process of this invention can be obtained from light hydrocarbons such as methane by means of steam reforming, partial oxidation, or other processes known in the art. Preferably the hydrogen is provided by free hydrogen, although some Fischer-Tropsch catalysts have sufficient water gas shift activity to convert some water and carbon monoxide to carbon dioxide and hydrogen, for use in the Fischer-Tropsch process. It is preferred that the molar ratio of hydrogen to carbon monoxide in the feed be greater than 0.5:1 (e.g., from about 0.67 to 2.5). Preferably, when cobalt, nickel, and/or ruthenium catalysts are used, the feed gas stream contains hydrogen and carbon monoxide in a molar ratio of about 1.6:1 to 2.3:1. Preferably, when iron catalysts are used the feed gas stream contains hydrogen and carbon monoxide in a molar ratio between about 1.4:1 to 2.3:1. The feed gas may also contain carbon dioxide. The feed gas stream should contain a low concentration of compounds or elements that have a deleterious effect on the catalyst, such as poisons. For example, the feed gas may need to be pretreated to ensure that it contains low concentrations of sulfur or nitrogen compounds such as hydrogen sulfide, ammonia, hydrogen cyanide and carbonyl sulfides.

The feed gas is contacted with the catalyst in a reaction zone. Mechanical arrangements of conventional design may be employed as the reaction zone including, for example, plugged flow, continuous stirred tank, fixed bed, fluidized bed, slurry bubble column, reactive distillation column, or ebulliating bed reactors, among others, may be used. The size and physical form of the catalyst may vary, depending on the reactor in which it is to be used. Plug flow, fluidized bed, reactive distillation, ebulliating bed, and continuous stirred tank reactors have been delineated in "Chemical Reaction Engineering," by Octave Levenspiel, and are known in the art, as are slurry bubble column. A suitable slurry bubble column is described, for example, in co-pending commonly assigned U.S. patent application Ser. No. 10/193,357, hereby incorporated herein by reference.

When the reaction zone includes a slurry bubble column, the column preferably includes a three-phase slurry. Further, a process for producing hydrocarbons by contacting a feed stream including carbon monoxide and hydrogen with a catalyst in a slurry bubble column, preferably includes dispersing the particles of the catalyst in a liquid phase comprising the hydrocarbons so as to form a two-phase slurry; and dispersing the hydrogen and carbon monoxide in the two-phase slurry so as the form the three-phase slurry. Further, the slurry bubble column preferably includes a vertical reactor and dispersal preferably includes injection and distribution in the bottom half of the reactor. Alternatively, dispersal may occur in any suitable alternative manner, such as by injection and distribution in the top half of the reactor.

The Fischer-Tropsch process is typically run in a continuous mode. In this mode, the gas hourly space velocity through the reaction zone may range from about 50 to about 10,000 $hr^{-1}$, preferably from about 300 $hr^{-1}$ to about 2,000 $hr^{-1}$. The gas hourly space velocity is defined as the volume of reactants per time per reactor bed volume. The reaction zone temperature is typically in the range from about 160° C. to about 300° C. Preferably, the reaction zone is operated at conversion promoting conditions at temperatures from about 190° C. to about 260° C. The reaction zone pressure is typically in the range of about 80 psig (653 kPa) to about 1000 psig (6994 kPa), preferably from 160 psig (1204 kPa) to about 600 psig (4237 kPa).

The products resulting from the process will have a great range of molecular weights. Typically, the carbon number range of the product hydrocarbons will start at methane and continue to about 50 to 100 carbons or more per molecule as measured by current analytical techniques. The process is particularly useful for making hydrocarbons having five or more carbon atoms especially when the above-referenced preferred space velocity, temperature and pressure ranges are employed.

The wide range of hydrocarbons produced in the reaction zone will typically afford liquid phase products at the reaction zone operating conditions. Therefore the effluent stream of the reaction zone will often be a mixed phase stream including liquid and vapor phase products. The effluent stream of the reaction zone may be cooled to condense additional amounts of hydrocarbons and passed into a vapor-liquid separation zone separating the liquid and vapor phase products. The vapor phase material may be passed into a second stage of cooling for recovery of additional hydrocarbons. The liquid phase material from the initial vapor-liquid separation zone together with any liquid from a subsequent separation zone may be fed into a fractionation column. Typically, a stripping column is employed first to remove light hydrocarbons such as propane and butane. The remaining hydrocarbons may be passed into a fractionation column where they are separated by boiling point range into products such as naphtha, kerosene and fuel oils. Hydrocarbons recovered from the reaction zone and having a boiling point above that of the desired products may be passed into conventional processing equipment such as a hydrocracking zone in order to reduce their molecular weight down to desired products such as middle distillates and gasoline. The gas phase recovered from the reactor zone effluent stream after hydrocarbon recovery may be partially recycled if it contains a sufficient quantity of hydrogen and/or carbon monoxide.

Without further elaboration, it is believed that one skilled in the art can, using the description herein, utilize the present invention to its fullest extent. The following exemplary embodiments are to be construed as illustrative, and not as constraining the scope of the present invention in any way whatsoever.

EXAMPLES

Comparative Example A

This is a comparative example for Example 1. A cobalt catalyst with a nominal composition of 20% cobalt, 0.02% platinum, and 0.5% boron was made by impregnating γ-alumina. The γ-lumina was obtained from Condea as Puralox SCCa 5/150. The γ-alumina was impregnated with an aqueous solution of cobalt nitrate ($Co(NO)_3 6H_2O$), platinum (II) acetylacetonate, and boric acid using an appropriate quantity for incipient wetness in a two step impregnation process. The resulting catalyst precursor was dried in air at 120° C. for 8 hours and calcined in air at 240° C. for four hours. After reduction at 400° C. for 16 hours using pure hydrogen at a gas flow rate of 700 cc/min in a fluidized bed, the catalyst was tested in a bench scale fixed bed reactor under conditions of 220° C. temperature, 350 psi pressure, and a feed rate of 6 NL/hr/g catalyst, with feed having a hydrogen to carbon monoxide molar ratio of 2. Results of testing are shown in Table 1.

TABLE 1

Single Precursor Catalyst

| Age (hrs) | CO Conv. (%) | $C_{5+}$ (g/hr/kg-cat) | $C_1$ (wt. %) | $CO_2/CO$ (mole %) |
| --- | --- | --- | --- | --- |
| 24 | 60 | 588 | 8.7 | 0.5 |
| 56 | 59 | 572 | 9.2 | 0.5 |
| 76 | 58 | 560 | 9.3 | 0.5 |

Example 1

A catalyst with a nominal composition of 20 wt. % cobalt and 0.01 wt. % platinum on γ-alumina was prepared. The γ-alumina was obtained from Condea as Puralox SCCa 5/150. Half of the cobalt was loaded by impregnating the support with a first solution containing cobalt nitrate. The resulting catalyst precursor was dried overnight at 90° C., dried at 120° C. for an hour and ramped at 2° C./min to 300° C. and calcined at 300° C. for 5 hours. The calcination was in air flowing at 700 mL/min. The other half of the cobalt was loaded by impregnating the support with a second solution containing cobalt acetate. The second solution also contained platinum acetyl acetonate. The resulting catalyst precursor was dried overnight at 90° C., dried at 120° C. for an hour and ramped at 2° C./min to 300° C. and calcined at 300° C. for 5 hours. The calcination was in air flowing at 700 mL/min. After reduction at 400° C. for 16 hours using pure hydrogen at 700 mL/min in a fluidized bed the catalyst was tested in a bench scale fixed bed reactor under conditions of 220° C. temperature, 350 psi pressure, and a feed rate of 6 NL/hr/g-catalyst, with a feed having a hydrogen to carbon monoxide molar ratio of 2. Results of testing are shown in Table 2.

TABLE 2

Multiple Precursors Catalyst

| Age (hrs) | CO Conv. (%) | $C_{5+}$ (g/hr/kg-cat) | $C_1$ (wt. %) | $CO_2/CO$ (mole %) |
| --- | --- | --- | --- | --- |
| 22.5 | 76 | 784 | 6.0 | 1.0 |
| 46.5 | 64 | 615 | 9.6 | 0.7 |
| 63 | 63 | 598 | 9.4 | 1.0 |

This example shows that a catalyst made with two precursors and promoted with platinum (Example 1) performed as well as a comparable catalyst promoted with twice as much platinum (Example A). Comparable performance was seen in each of the CO conversion, $C_{5+}$ productivity, and $C_1$ selectivity.

Should the disclosure of any of the patents and publications that are incorporated herein conflict with the present specification to the extent that it might render a term unclear, the present specification shall take precedence.

While preferred embodiments of this invention have been shown and described, modifications thereof can be made by one skilled in the art without departing from the spirit or teaching of this invention. The embodiments described herein are exemplary only and are not limiting. Many variations and modifications of the catalyst and process are possible and are within the scope of the invention. Accordingly, the scope of protection is not limited to the embodiments described herein, but is only limited by the claims that follow, the scope of which shall include all equivalents of the subject matter of the claims.

What is claimed is:

1. A method for making a supported cobalt catalyst, said method comprising the steps of:
    a) loading cobalt onto a support, wherein the cobalt is in the form of at least a first cobalt precursor compound and a second cobalt precursor compound, wherein said first and second cobalt precursor compounds are different compounds, the loading comprising:
        loading the first cobalt precursor compound,
        separately loading the second cobalt precursor compound; and b) loading a promoter onto the support in an amount effective so as to achieve a catalyst with similar performance as that of a comparable catalyst comprising a greater amount of the promoter and prepared by loading not more than one of the first and second cobalt precursor compounds.

2. The method according to claim 1 wherein step a) comprises selecting the precursors such that the portion of cobalt loaded as one of the first and second precursor compounds is more easily reduced than the portion of the cobalt loaded as the other of the first and second precursor compounds.

3. The method according to claim 1 wherein at least a portion of step b) is performed simultaneously with at least a portion of step a) such that at least a portion of the promoter is loaded concurrently with at least a portion of cobalt.

4. The method according to claim 1 wherein at least a portion of the promoter is loaded concurrently with at least a portion of the second cobalt precursor compound.

5. The method according to claim 1 wherein step b) follows step a).

6. The method according to claim 1 wherein step b) precedes step a).

7. The method according to claim 1 wherein the first and second precursor compounds of cobalt are each selected from the group consisting of cobalt nitrate, cobalt carbonyl, cobalt acetate, cobalt acetylacetonate, and cobalt oxalate.

8. The method according to claim 1 wherein the first precursor compound of cobalt is cobalt nitrate.

9. The method according to claim 8 wherein the second precursor compound of cobalt is cobalt acetate.

10. The method according to claim 1 wherein the effective amount of the promoter is not more than 75% of the content of promoter in the comparable catalyst.

11. The method according to claim 1 wherein the effective amount of the promoter is not more than 50% of the content of promoter in the comparable catalyst.

12. The method according to claim 1 wherein the promoter is selected from the group consisting of rhenium, ruthenium, platinum, palladium, silver, boron, and combinations thereof.

13. The method according to claim 1 wherein the promoter is a noble metal.

14. The method according to claim 1 wherein step b) comprises loading more than one promoter metal.

15. The method according to claim 1 wherein loading in steps a) and b) comprises impregnation.

16. The method according to claim 1 wherein the support is selected from the group consisting of alumina, modified alumina, silica-alumina, titania, zirconia, fluorided metal oxides, borated alumina, aluminum fluoride, aluminum boride, and combinations thereof.

17. The method according to claim 1 wherein the support is selected from the group consisting of alumina, modified alumina, and combination thereof.

18. The method according to claim 1 wherein the support comprises at least 50% by weight alumina.

19. A method for making a supported cobalt catalyst, said method comprising the steps of:
  a) loading cobalt onto a support comprising alumina, wherein the cobalt is in the form of at least two different cobalt precursor compounds, said loading comprising loading a first cobalt precursor compound and separately loading a second cobalt precursor compound; and
  b) loading a noble metal promoter onto the support in an amount effective to produce a catalyst with similar performance as that of a comparable catalyst comprising a greater amount of the noble metal promoter and prepared by loading not more than one of the cobalt precursor compounds.

20. A method for making a supported cobalt catalyst, said method comprising the steps of:
  a) loading cobalt onto a support, wherein the cobalt is in the form of at least two different cobalt precursor compounds, said loading comprising loading a first cobalt precursor compound comprising cobalt nitrate and separately loading a second cobalt precursor compound comprising cobalt acetate; and
  b) loading a promoter onto the support in an amount effective to produce a catalyst with similar performance as that of a comparable catalyst comprising a greater amount of the promoter and prepared by loading not more than one of the cobalt precursor compounds.

* * * * *